(12) United States Patent
Dikvall et al.

(10) Patent No.: US 8,909,031 B2
(45) Date of Patent: Dec. 9, 2014

(54) METHOD AND ARRANGEMENT FOR RECORDING A MEDIA STREAM

(75) Inventors: Henrik Dikvall, Vaxholm (SE); Per Cronvall, Upplands Väsby (SE)

(73) Assignee: Saab AB, Linkoeping (SE)

(*) Notice: Subject to any disclaimer, the term of this patent is extended or adjusted under 35 U.S.C. 154(b) by 0 days.

(21) Appl. No.: 13/701,988

(22) PCT Filed: Jun. 21, 2010

(86) PCT No.: PCT/SE2010/050704
§ 371 (c)(1),
(2), (4) Date: Mar. 18, 2013

(87) PCT Pub. No.: WO2011/162647
PCT Pub. Date: Dec. 29, 2011

(65) Prior Publication Data
US 2013/0209072 A1    Aug. 15, 2013

(51) Int. Cl.
*H04N 5/76* (2006.01)
*G06K 9/36* (2006.01)
*H04N 19/00* (2014.01)
*G11B 27/32* (2006.01)
*H04N 19/64* (2014.01)
*G06K 9/46* (2006.01)

(52) U.S. Cl.
CPC ............... *H04N 19/00* (2013.01); *G11B 27/32* (2013.01); *H04N 19/00842* (2013.01)
USPC ........... 386/295; 386/291; 386/294; 382/232; 382/234; 382/240; 382/244; 382/246; 382/248; 382/247

(58) Field of Classification Search
USPC ......... 382/232, 234, 240, 244, 246, 247, 248; 386/291, 294, 295
See application file for complete search history.

(56) References Cited

U.S. PATENT DOCUMENTS 5,608,539 A * 3/1997 Sakamoto ................ 358/426.05
6,246,797 B1 * 6/2001 Castor et al. .................. 382/232
(Continued)

FOREIGN PATENT DOCUMENTS

EP    1134968 A2    9/2001
EP    1158764 A2    11/2001
(Continued)

OTHER PUBLICATIONS

Skodras, Athanassios, et al., "The JPEG 2000 Still Image Compression Standard," *IEEE Signal Processing Magazine*, Sep. 2001, pp. 36-58, IEEE, New York.

(Continued)

*Primary Examiner* — Daquan Zhao
(74) *Attorney, Agent, or Firm* — Alston & Bird LLP (57) ABSTRACT

The present invention relates to the field of digital media recording such as video or audio, where compression is used to reduce the amount of data to save onto a data storage. In particular the invention relates to recording media, wherein the memory area required to store the media is unknown. The invention discloses a method for recording digital streamed media with a number of media frames in a memory by encoding each media frame into an encoded frame comprising a first number of quality layers, such as the quality layers in JPEG2000. The invention further relates to detecting if the data storage is full and if the data storage is full, storing new frames in the data storage previously occupied by the quality layer representing the highest resolution of the previously stored encoded frames. The invention also relates to a corresponding media recorder and computer program.

21 Claims, 6 Drawing Sheets

(56) References Cited

U.S. PATENT DOCUMENTS

| | | | |
|---|---|---|---|
| 7,751,628 B1 | 7/2010 | Reisman | |
| 2002/0191951 A1* | 12/2002 | Sodeyama et al. | 386/46 |
| 2008/0317431 A1* | 12/2008 | Mishima et al. | 386/52 |

FOREIGN PATENT DOCUMENTS

| | | | |
|---|---|---|---|
| EP | 1395035 A1 | 3/2004 | |
| WO | WO 01/37209 A1 | 5/2001 | |

OTHER PUBLICATIONS

International Searching Authority, "International Search Report—Corrected," for International Application No. PCT/SE2010/050704, mailed Mar. 4, 2011, 5 pages, Swedish Patent and Registration Office, Stockholm.

International Preliminary Examining Authority, "International Preliminary Report on Patentability" for International Application No. PCT/SE2010/050704, including Applicant's Apr. 21, 2012 Response to the Written Opinion, dated Oct. 9, 2012, 15 pages, Swedish Patent and Registration Office, Stockholm.

International Searching Authority, "International Search Report," for International Application No. PCT/SE2010/050705, mailed Mar. 4, 2011, 5 pages, Swedish Patent and Registration Office, Stockholm.

International Preliminary Examining Authority, "International Preliminary Report on Patentability" for International Application No. PCT/SE2010/050705, including Applicant's Apr. 23, 2012 Response to the Written Opinion, dated Oct. 9, 2012, 19 pages, Swedish Patent and Registration Office, Stockholm.

* cited by examiner

METHOD AND ARRANGEMENT FOR RECORDING A MEDIA STREAM

CROSS REFERENCE TO RELATED APPLICATIONS

This application is a national stage application, filed under 35 U.S.C. §371, of International Application No. PCT/SE2010/050704, filed Jun. 21, 2010, the contents of which are hereby incorporated by reference in its entirety.

BACKGROUND OF THE INVENTION

1. Related Field

The present invention relates to the field of recording digital media such as video or audio, where compression is used to reduce the amount of data to save onto a data storage. In particular the invention relates to recording digital media, wherein the memory area required to store the digital media is unknown. This could e.g. be a media stream comprising an unknown number of media frames or a media stream with unknown content. The invention also relates to a corresponding media recorder and computer program product for recording streamed digital media.

2. Description of Related Art

When recording digital streamed media the recording time and thereby the size of the recorded media, is often not known beforehand. One example is a helicopter, having a video or infrared camera, recording digital media during a mission. In such an application the flight time may be unknown. Therefore, it is not possible to beforehand determine the size of the memory or other data storage required to store the recorded data.

In a state of the art real time video compression system, one cannot go back and recompress a frame with a different target rate afterwards. Each frame passes the videocompressor only one time and the compression rate needs to be specified beforehand. Therefore, one often has to compromise between bitrate, i.e. quality, and the risk of memory overflow. There is also a risk that an unnecessarily large memory is chosen, in order to avoid the risk of memory overflow. This is a problem, because a data storage such as a memory is often a costly component in digital video recorders. Therefore, it is not desired to have larger memory capacity, i.e. make it more expensive, than it has to.

In order to avoid memory overflow, it is common to have a required minimum recording time in digital video recorders. The traditional way to fulfil this requirement is by using a video compression algorithm in a Constant Bitrate (CB) mode. This entails that the maximum bitrate is known, and therefore it is possible to dimension the data storage to ensure that it's capacity is big enough for the required minimum time. The required minimum recording time, normally comes from the defined maximum mission time for the actual craft/crew. In reality, the majority of the missions will however not be near as long as the defined maximum mission time. This means that for the majority of the missions only a part of the available memory capacity will be used, which implies that video could have been stored with higher bitrate i.e. better quality, than it was. The difficulty is to know the mission length before the mission is started, which is impossible.

In some applications there may also be several media inputs, sharing one memory. In such a case, the available memory is dependent on the number of active sensors during flight time, which may also not be known beforehand. A helicopter may comprise one video camera and one IR camera. In many occasions only one camera is used. However, during flight the crew may choose to activate a second camera. As this will not be known beforehand, an unnecessarily low bitrate will be used in order to leave space for a possible second media input. However, this implies that in many applications an unnecessarily low bitrate is used for recording, even when there is a lot of free memory space when the recording is finalised.

Similar problems may occur in any application comprising a media recorder wherein the recording length or the size of the encoded data is not known beforehand, e.g. in a video camera an audio recorder, a mobile phone or in a surveillance camera.

Considering the mentioned drawbacks with current technology, finding a way to optimize the usage of the memory in a digital media recorder, would be most welcome.

BRIEF SUMMARY

It is an object of the present invention to offer a recording system without an upper limit for recording time, wherein quality is sacrificed when memory space is full.

The invention addresses the problem of not being able to know the required recording length beforehand. The idea is to set up the encoder algorithm, of an encoder using quality layers, in a compression mode, such as Constant Quality (CQ) with a target quality that is near visually lossless, and to use a variable number of quality layers. When recording is started all quality layers of each frame are stored until the memory is full. If the memory becomes full, but recording is required to continue, then quality is sacrificed by discarding the quality layer or layers representing the highest resolution of already recorded frames.

By the use of quality layers, the media recorder according to the present invention ensures that the data storage is used in the most optimal way, which in turn ensures the best possible image quality for the actual time recorded.

More specifically the invention relates to a method for recording a first digital media stream, comprising a number of media frames, in a data storage, comprising the following steps:

encoding each media frame of the first digital media stream into an encoded frame comprising a first number of quality layers, representing successive quality refinements of the media frame, detecting if the data storage is full and if the data storage is not full, for each encoded frame storing all the first number of quality layers in the data storage, and if the data storage is full, for each encoded frame, storing a second number of quality layers in one or more areas in the data storage previously occupied by the quality layer representing the highest resolution of the stored encoded frames.

According to one aspect of the invention the second number of quality layers is equal or less than the number of quality layers of the stored encoded frames having the least number of quality layers.

According to one aspect of the invention the method further comprises the step of setting up an encoder for encoding the media frames of the media stream in a compression mode.

According to one aspect of the invention the compression mode is constant quality (CQ) with a target quality that is visually lossless.

According to one aspect of the invention the method further comprises the step of recording a second digital media stream comprising a number of media frames, in the data storage.

According to one aspect of the invention the method further comprises the step of encoding each media frame of the second digital media stream into an encoded frame comprising a third number of quality layers, representing successive quality refinements of the media frame and if the data storage is not full, for each encoded frame storing all the third number of quality layers in the data storage, and if the data storage is full, for each encoded frame, storing a fourth number of quality layers of data in one or more areas, in the data storage, previously occupied by a quality layer representing the highest resolution of the stored encoded frames.

According to one aspect of the invention the data storage is a memory and the method further comprises the step of storing the quality layers representing the same level of resolution of different media frames on adjacent memory addresses.

According to one aspect of the invention the encoder is a JPEG2000 encoder.

According to one aspect of the invention the method further comprises the step of:

if the data storage is full, for each encoded frame storing a second number of quality layers in one or more areas in the data storage previously occupied by two or more quality layers representing the highest resolutions of stored encoded frames.

According to one aspect of the invention it relates to a media recorder for recording a first digital stream comprising an unknown number of media frames comprising:

means for receiving a first media stream, a first encoder adapted to encode each media frame in the first digital stream in the into an encoded frame, the encoded frame comprising a first number of quality layers, representing successive quality refinements of the media frame, a data storage for storing the encoded frames a controller having i. means for detecting if the data storage is full, ii. means for storing all the first number of quality layers for each encoded frame, if the data storage is not full, and iii. means for storing a second number of quality layers for each encoded frame, in a one or more areas, in the data storage, previously occupied by the quality layer representing the highest resolution of the stored encoded frames, if the data storage is full.

According to one aspect of the invention the second number of layers is equal or less than the number of quality layers of the stored encoded frames currently having the least number of quality layers.

According to one aspect of the invention the first encoder is adapted to be set up in one of several different compression modes.

According to one aspect of the invention one compression mode is constant quality (CQ) with a target quality that is visually lossless.

According to one aspect of the invention the media recorder comprises means for receiving a second digital media stream.

According to one aspect of the invention the media recorder further comprises a second encoder adapted to encode each media frame of the second digital media stream into an encoded frame comprising a third number of quality layers and wherein the controller further comprises:

iv. means for storing all the third number of quality layers for each encoded frame, if the data storage is not full, and v. means for storing a fourth number of quality layers for each encoded frame of the second media stream, in a one or more areas, in the data storage, previously occupied by one or several quality layers representing the highest resolution of stored encoded frames, if the data storage is full.

According to one aspect of the invention the data storage is a memory and the controller further comprises:

means for storing the quality layers representing the same resolution of different media frames on adjacent memory addresses.

According to one aspect of the invention the first encoder is a JPEG2000 encoder.

According to one aspect of the invention the media recorder further comprises means for, if the data storage is full, storing a second number of quality layers for each encoded frame, in a data storage area previously occupied by two or more quality layers representing the highest resolutions of the stored encoded frames.

According to one aspect of the invention the media is video. According to another aspect of the invention the media is audio.

According to one aspect of the invention it relates to a computer program product having a computer readable medium thereon including programmed instructions that when executed on a computer causes the computer to perform the method described above.

An advantage of the media recorder according to the invention is that the user always gets the best possible quality on the recorded media.

A further advantage is that memory size can be selected on the "most common" usage scenario rather than the worst case usage scenario. This in turn can lower unit cost.

A further advantage is that there is no longer an upper limit for recording time. Even with a very small memory you will be able to record a very long segment of time.

An advantage with one aspect of the invention is that it provides for a method and media recorder which enables handling a memory when several data inputs are sharing one common data storage.

BRIEF DESCRIPTION OF THE FIGURES

Further objects and features, of the present invention will appear from the following detailed description of aspects of the invention, wherein the aspects will be described in more detail with reference to the accompanying drawings, in which.

It should be added that the following description of the aspects is for illustrative purposes only and should not be interpreted as limiting the invention exclusively to these aspects.

DETAILED DESCRIPTION OF VARIOUS EMBODIMENTS

The illustrations of present invention relate, in general, to the field of video cameras in vehicles. However, the invention could also be implemented in any device where media compression is used to reduce the amount of data to save onto a data storage.

Aspects of the present invention will be described more fully hereinafter with reference to the accompanying drawings, in which different aspects of the invention are shown. This invention may, however, be embodied in many different forms and should not be construed as limited to the aspects set forth herein. Rather, these aspects are provided so that this disclosure will be thorough and complete, and will fully convey the scope of the invention to those skilled in the art. Like reference signs refer to like elements throughout.

Figure 1:
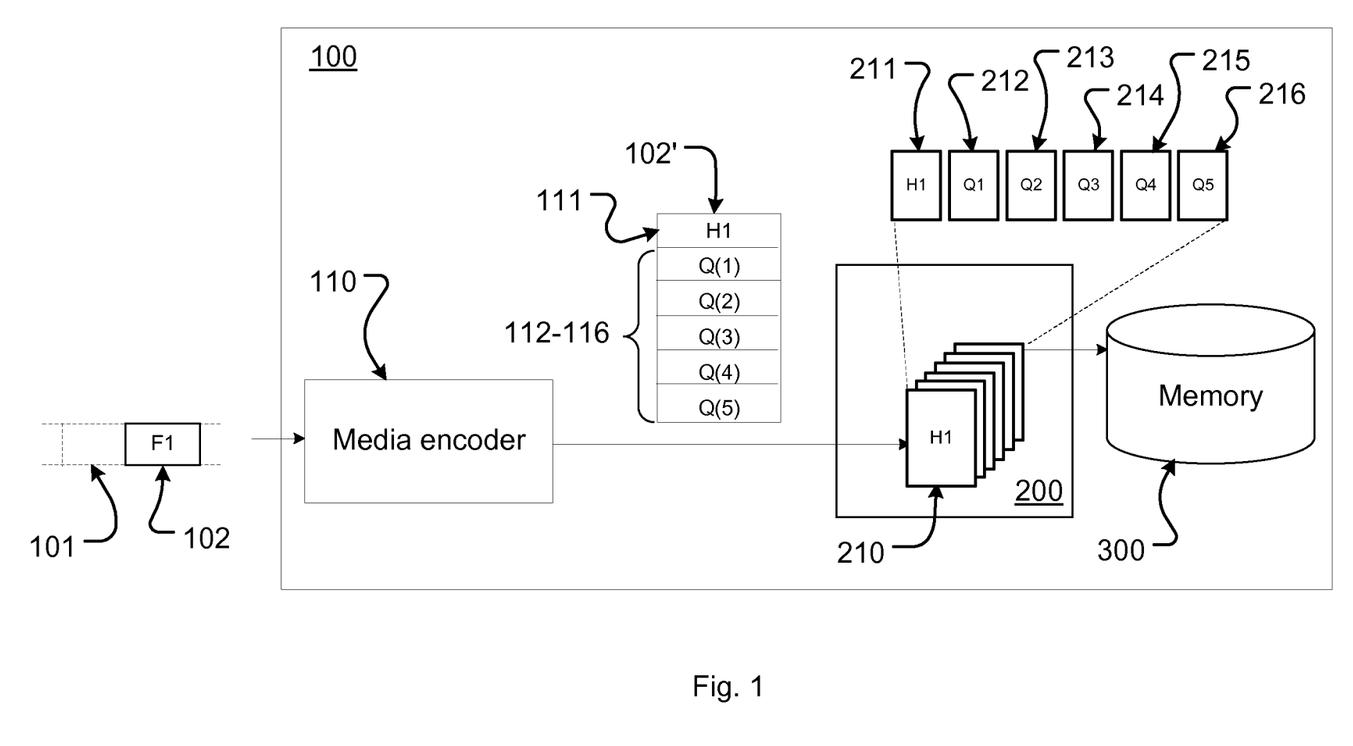
FIG. 1 schematically illustrates a digital media recorder.

FIG. 1 illustrates a digital media recorder 100 for receiving and compressing a digital media stream 101, such as a video or audio stream, and for storing the compressed data. The digital media recorder 100 comprises a media encoder 110, a file manager 200 and a data storage 300. The media encoder 110 is adapted to encode a media frame 102 into an encoded frame 102'. A frame refers to fixed sized data blocks within the digital media stream. A frame in a video stream is typically an image.

The encoded frame 102' comprises a header (H) 111 and five quality layers (Q) 112-116. The quality layers (Q) 112-116 represent successive quality refinements of the complete media frame 102. Hence, each encoded frame 102' may be decoded only using data from the quality layer representing the lowest resolution. If only one layer is used for decoding, the resolution will then be very low. Quality will then increase monotonically with each layer added, and the image distortion will shrink from layer to layer. The number of quality layers (Q) generated by the encoder may be specified by the user. An example of an encoder using quality layers is a JPEG2000 encoder. JPEG2000 is a commonly known video compression standard and will therefore not be described in detail in this application.

A file system is a structure for storing and organizing computer files and the data they contain to make it easy to find and access them. The media recorder 100 uses a file manager 200 for organising the data in a file system and for storing the organised files in the memory 300. Each encoded frame 102' is organised in a set of files 210 by the file manager 200. The set of files 210 comprises one file 211 for the header (H) 111 and one file 212-216 for each quality layer (Q) 112-116 of the encoded frame 102'. Using a file system is one way of organising the encoded frames in the memory. The quality layers (Q) 112-116 may also be organised in the memory 300 using another implementation for handling memory allocation e.g. a hardware or software implemented memory manager.

The data storage 300 is the final storage for the files of the files containing each encoded frame 102'. In a digital video recorder in a helicopter, the data storage is preferably a memory 300 such as solid state drive (SSD), due to that vibrations caused by the helicopter may influence the performance of a data storage having moving parts. However, any digital data storage device may be used for the invention if suitable for the intended application.

The operation of the media recorder will now be described in more detail with reference to FIG. 2-4.

Figure 2A:
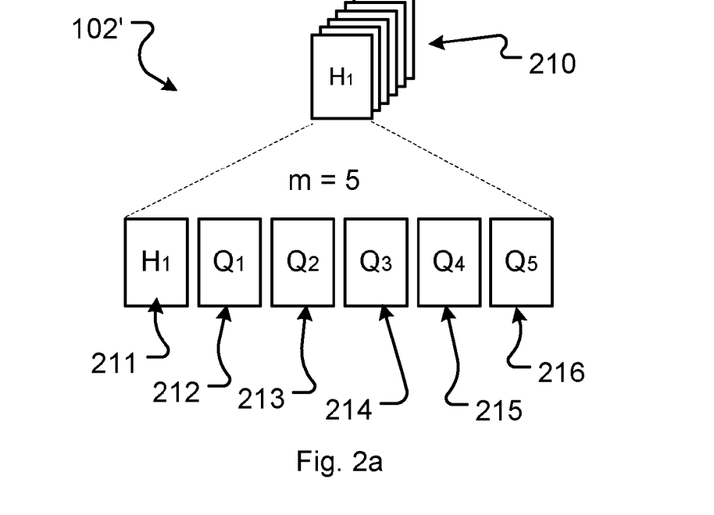
FIG. 2 schematically illustrates storing encoded media in a memory.
Figure 2B:
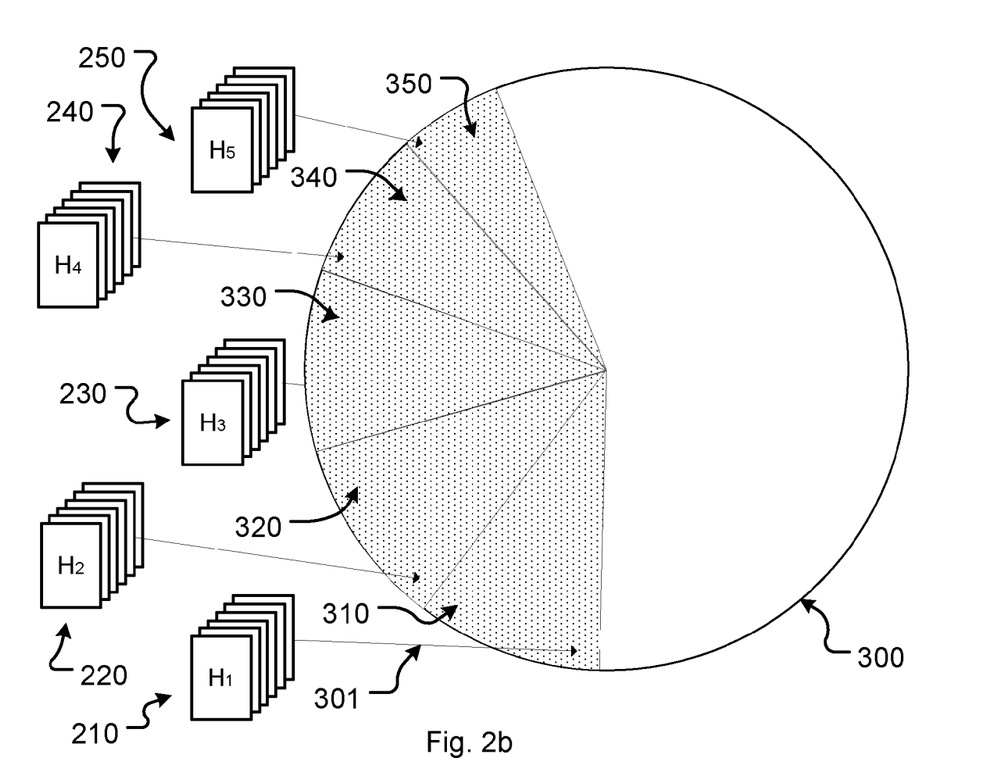

FIG. 2a illustrates an encoded frame 102' stored in a set of files 210. The set of files includes one file containing the header (H) 211 of the encoded media frame and five files containing quality layers (Q) 212-216. File 212 represent the highest resolution and 216 the lowest resolution of the encoded frame. The size of the quality layers (Q) 212-216 may vary dependent on the complexity of the media. A black image may e.g. be encoded with very few bits. The size of the different quality layers may also differ. Hence all five quality layers (Q) 212-216 may have different contribution to the resolution. The resolution defined by each layer may be defined by the user. As an example a losslessly encoded Full HD image may e.g. be about 2 Mbyte. If using 5 quality layers each layer may then be in the range 500-1000 Kbyte and the header about 1-2 Kbyte FIG. 2b illustrates how the files are stored in the memory 300. In FIG. 2b the media recorder has started to record a digital media stream. Five sets of files 210, 220, 230, 240, 250, corresponding to five media frames, have been recorded. Each encoded frame contains one header (H) and five quality layers (Q). Each set of files has a memory pointer 301 pointing to a memory area 310, 320, 330, 340, 350, in the memory 300, wherein the data is stored.

Figure 3:
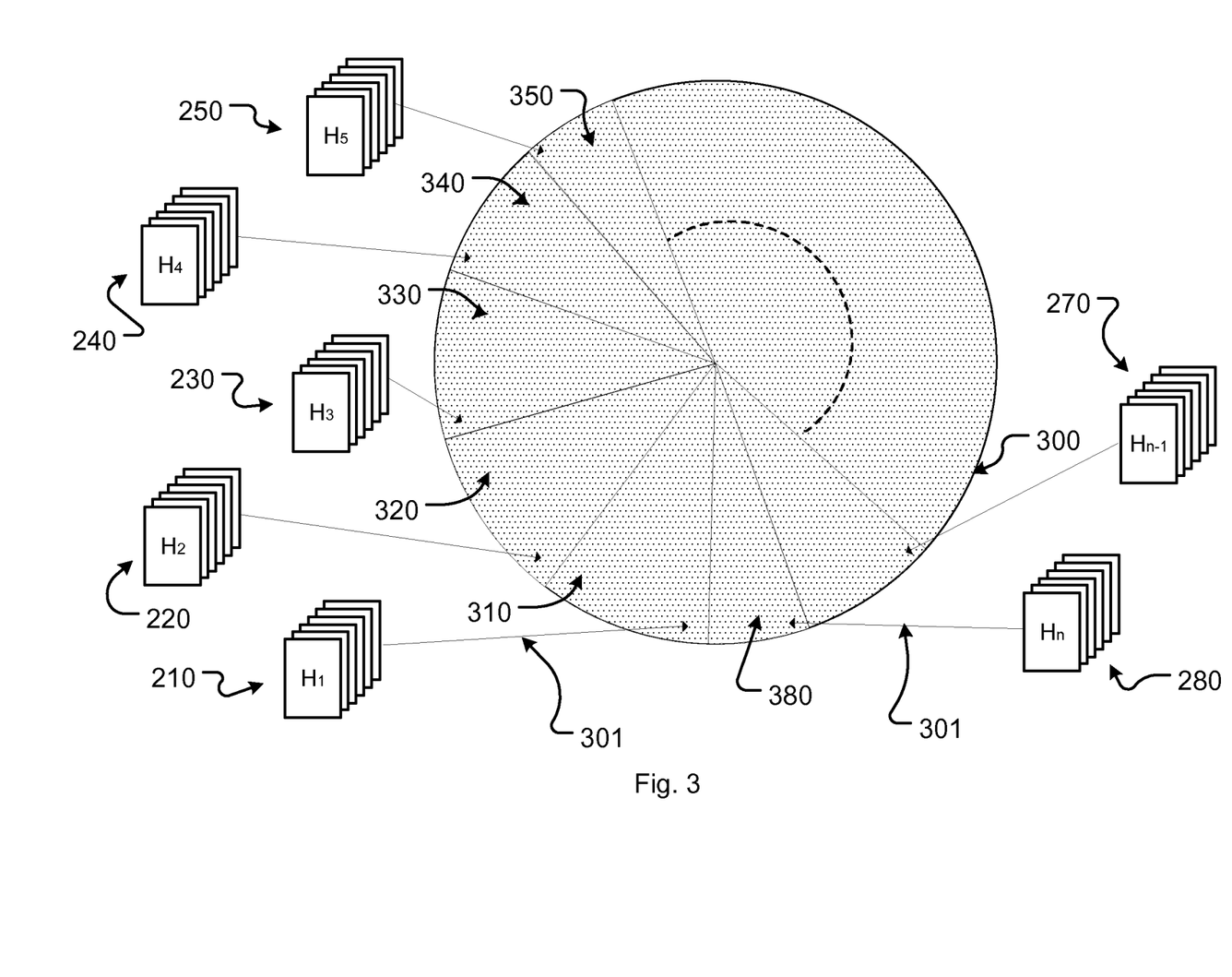
FIG. 3 schematically illustrates discarding some previously recorded media, when the memory is full.

In FIG. 3 the media recorder 100 has recorded n sets of media files corresponding to n media frames. When the $n^{th}$ set of files 280 corresponding to media frame n is stored in memory area 380, the memory 300 is full.

Figure 4:
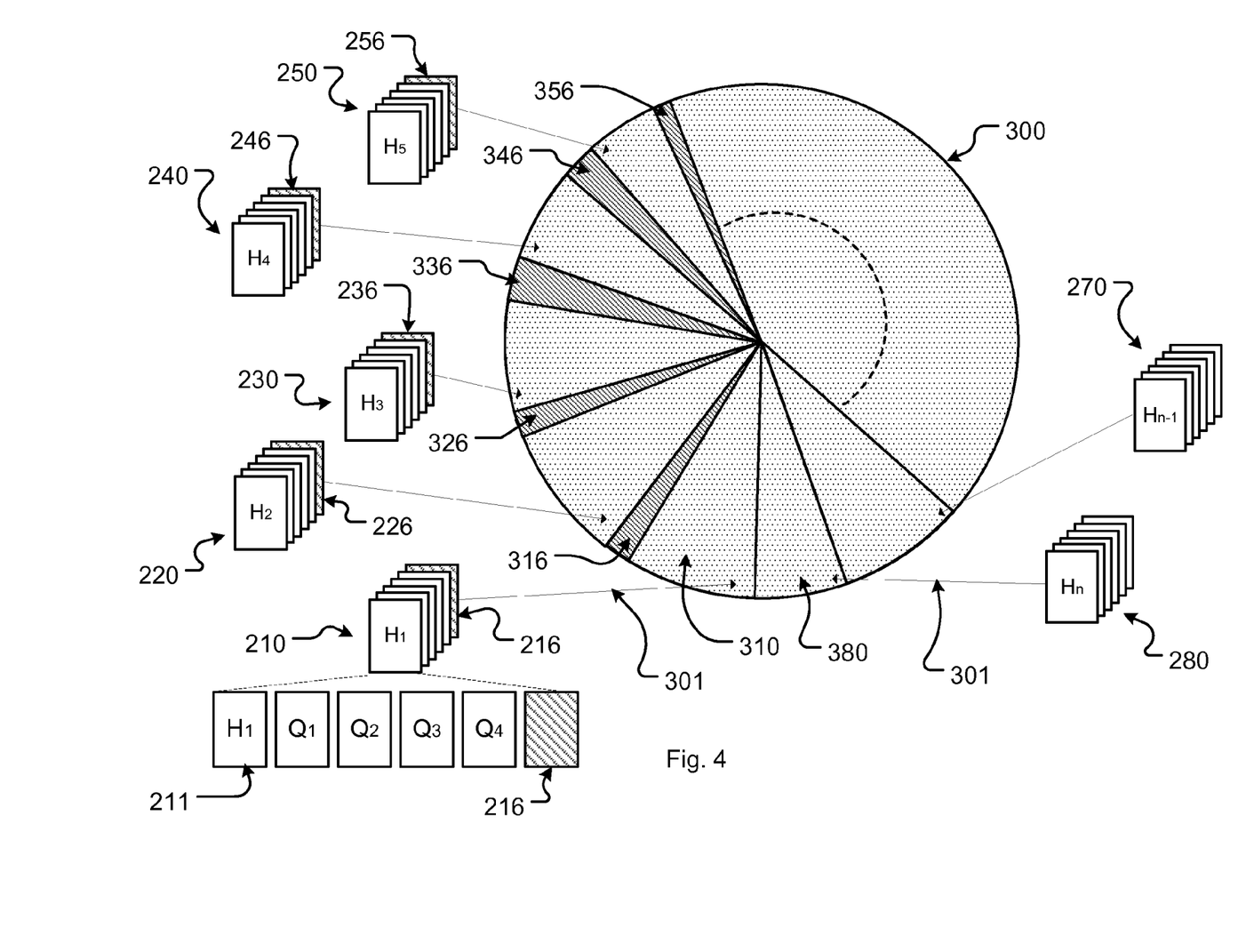
FIG. 4 schematically illustrates how to store new frames, when the memory is full.

FIG. 4 illustrates that the media recorder 100 is adapted to free up memory space for new frames. When the memory 300 is full, some of the already stored data needs to be discarded. This can be done by deleting the discarded data or by simply overwriting the discarded data. The media recorder 100 discards the upper quality layer ($Q_5$) 216, 226, 336, 346, 356, i.e. the layer representing the highest resolution, in five previously stored frames 210, 220, 230, 240, 250. The number of frames wherein one layer needs to be discarded may be fixed or calculated e.g. based on knowledge about the media stream. The number of frames should at least be big enough to ensure that the space made available fits at least one compressed frame. The user of the media recorder can also select to delete more than one quality layer in each previously stored encoded frame.

When the uppermost quality layer (Q) of frames 210, 220, 230, 240, 250 is deleted free, memory space becomes available 310, 320, 330, 340, 350. The memory made available will be fragmented. However, the organization of the memory will be handled by the file system. Note that this embodiment is for illustrative purposes only, and that the memory allocation is normally more advanced in reality. The memory usage in a file system is not as simple as appears from the figures, but rather more complex. FIG. 4 illustrates the principle for freeing up memory.

Figure 5:
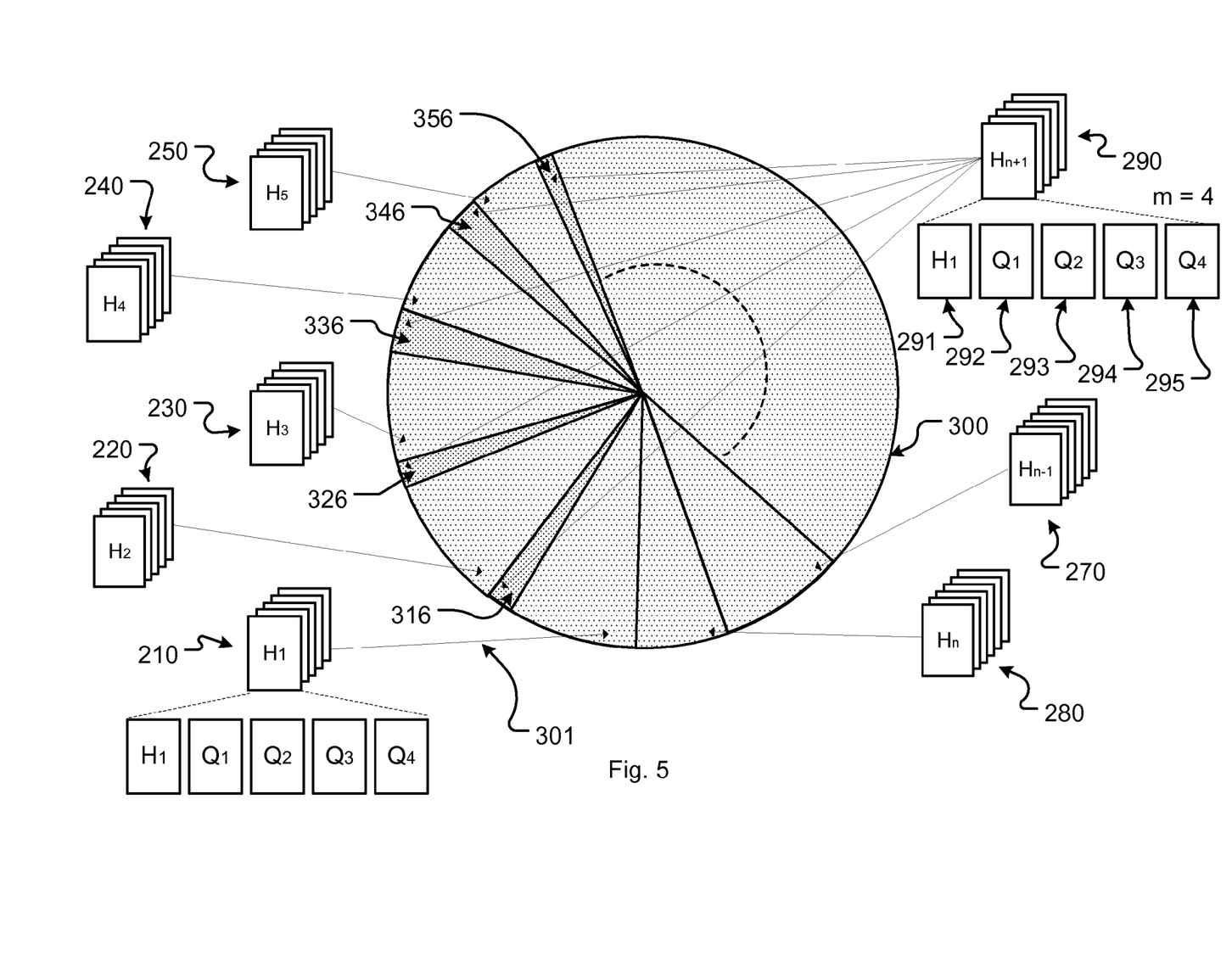
FIG. 5 is a flowchart describing recording digital streamed media.

FIG. 5 discloses that the media recorder 100 is adapted to store a set of files 290, representing a new media frame 290, in the memory spaces denoted 316, 326, 336, 346, 356 previously occupied by the upper layer of previously recorded media frames 210, 220, 230, 240 and 250. These frames now only contain four quality layers (Q). For the coming frames a header (H) 291 and only four quality layers (Q) 292, 293, 294 and 295 are stored (m=4). Hence, as new frames are recorded the quality of the media data recorded in the memory 300 will gradually decrease. When the fifth quality layer is deleted for all frames in the memory, the recorder will start discarding the fourth quality layer of already stored frames, and so on. At last only one quality layer will remain. By setting the resolution of the lowest quality layer, i.e. the layer representing the lowest resolution, to a very low value, a virtually endless recording time will be achieved. Hence, as long as there is memory left a virtually lossless coding, i.e. best possible quality is used. When the disk gets full, a gradual decrease in the quality of the complete media is obtained, as long as the recording continues. By discarding previously recorded data when the memory is full, memory overflow is avoided.

Figure 6:
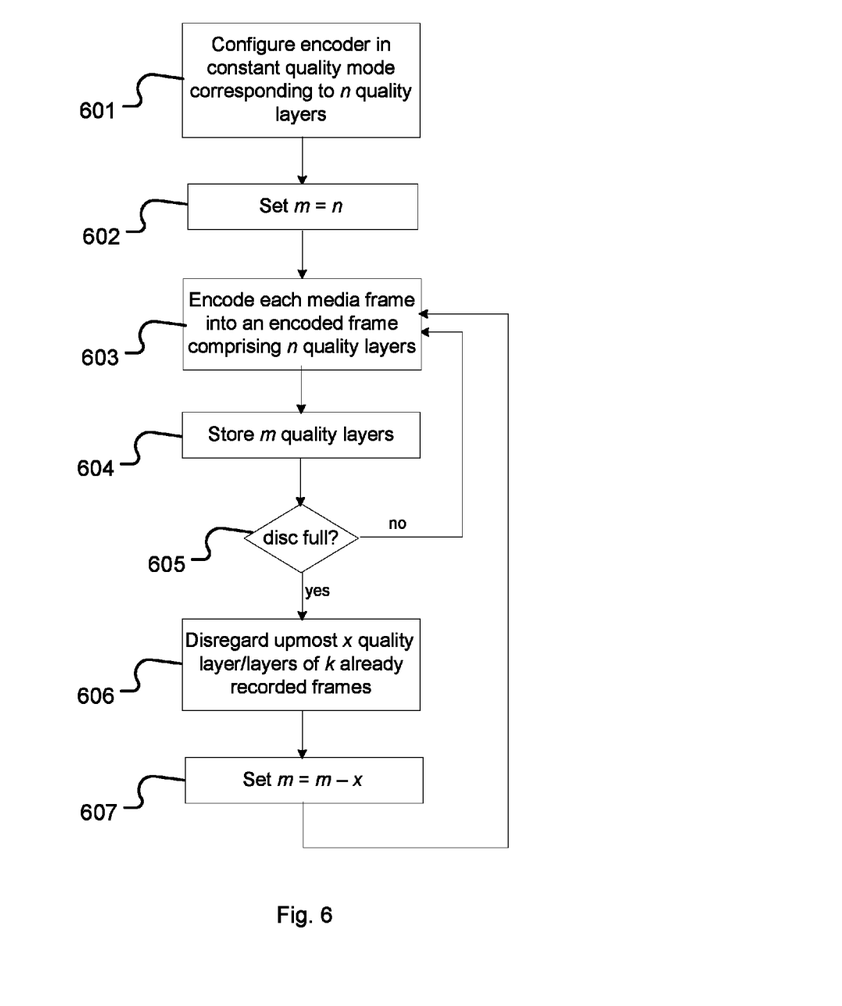
FIG. 6 is a flowchart describing the method of recording streamed media.

FIG. 6 illustrates the method of recording streamed media in a flowchart. In the first step 601, the media encoder 110 is configured in a constant quality mode with a target quality that is near visually lossless, corresponding to n quality layers (Q). The variable n indicates the number of quality layers generated by the encoder. In the next step 602 the media recorder is configured to initially store all n quality layers. The variable m indicates how many of the generated quality layers should be stored in the memory 300.

In step 603 the media recorder starts encoding the digital media stream 101. Each media frame is encoded into an encoded frame comprising n quality layers. In step 604 m out of n quality layers are stored in the memory 300. After encoding the encoded data a check 605 is done to find out if the memory is full. If the memory is not full, the decoding continues according to step 603.

If the memory is full, memory space needs to be freed. This is done in step 606 by discarding the upmost x quality layer/layers of the first k no of recorded frames. The variable x indicates the number of layers to discard in each previously recorded frame and the variable k indicates the number of frames to discard, where k and x could be selected from case to case, but should at least be selected big enough so that the space made available at least fits one compressed frame. The number of layers to discard could be one ore several. When memory is freed up the variable m, corresponding to how many of the quality layers should be stored, is set to m−x. Hence, coming quality layers are stored with no more quality layers than the frames that presently has least quality layers in the memory. After this step encoding continues according to step 603 until the memory is full again.

According to one aspect of the invention quality layers representing the same resolution of different media frames are stored in one part of the data storage, such as on adjacent memory addresses. For example, in an application using two quality layers, all files containing quality layer one are stored in a first area, all files containing quality layer two are stored in a second area, wherein the first area is located next to the first area. Thereby, the first files in the second area will be overwritten when the first area is full. Thereby, new frames of the second quality layer, representing the higher resolution, will be stored on an address pointing outside the memory, i.e. these frames are discarded. Hence, an efficient implementation of the invention can be done by organizing the data this way.

In one aspect of the invention the media recorder has two or more media inputs sharing one data storage. In such a case, the available memory for each media stream, is dependent on the number of active inputs. The recorder may contain several encoders, e.g. one audio encoder and one video encoder. The operation will follow the same principle of deleting the upper quality layers of previously stored frames, when the data storage is full. Hence, each encoder will be set up in a compression mode. The compression mode is e.g. constant quality with a target that is visually lossless. As long as the data storage is not full, all the quality layers of both encoders will be stored in the data storage. When the data storage becomes full the quality layer representing the highest resolution of one or both media streams will be discarded. In a mission where all inputs are active, the data storage will be shared between the media streams from the different inputs. However, if only one input, e.g. the sonar in a submarine, is active, full quality will almost always be obtained.

In a recorder having several inputs the high resolution data of the different inputs may be treated differently, when the memory is full. One media stream may e.g. be considered more important or more sensitive to distorsion. The user may choose to keep all quality layers for that media stream, wherein the quality for other media streams is sacrificed. The setup of the different media streams of the recorder may vary from time to time.

According to one aspect of the invention it may also be possible for the user to control the data, such that parts of the data is protected from the quality degradation caused by discarding quality layers. During flight the crew may e.g. note an event of particular interest. The crew may then choose to protect one part of the recorded data from quality degradation caused by the discarding of quality layers, that will take place if the data storage becomes full. Protection can be done by some kind of marker or write protection.

The foregoing has described the principles, preferred aspects and modes of operation of the present invention. However, the invention should be regarded as illustrative rather than restrictive, and not as being limited to the particular aspects discussed above. The different features of the various aspects of the invention can be combined in other combinations than those explicitly described. It should therefore be appreciated that variations may be made in those aspects by those skilled in the art without departing from the scope of the present invention as defined by the following claims.

The invention claimed is:

1. A method for recording a first digital media stream with an unknown length, comprising a number of media frames, in a data storage, comprising the following steps:
   setting up an encoder for encoding the media frames of the media stream in a compression mode;
   encoding each media frame of the first digital media stream with an unknown length into an encoded frame comprising a first number of quality layers, representing successive quality refinements of the media frame;
   simultaneously with and during ongoing making of the first digital media stream with the unknown length, detecting if the data storage is full; and
   if the data storage is not full, for each encoded frame storing all the first number of quality layers in the data storage; and
   if the data storage is full, simultaneously with and during the ongoing making of the first digital media stream, for each encoded frame, storing, based at least in part upon said detecting that the data storage is full, a second number of quality layers in one or more areas in the data storage previously occupied by the quality layer representing the highest resolution of the stored encoded frames, the second number of quality layers differing relative to the first number of quality layers in the data storage.

2. The method according to claim 1, wherein the second number of quality layers is equal or less than the number of quality layers of the stored encoded frames having the least number of quality layers.

3. The method according to claim 1, wherein the compression mode is constant quality (CQ) with a target quality that is visually lossless.

4. The method according to claim 1, further comprising the step of recording a second digital media stream comprising a number of media frames, in the data storage.

5. The method according to claim 4, further comprising the steps of:
   encoding each media frame of the second digital media stream into an encoded frame comprising a third number of quality layers, representing successive quality refinements of the media frame; and if the data storage is not full, for each encoded frame storing all the third number of quality layers in the data storage; and if the data storage is full, simultaneously with and during the ongoing making of the first digital media stream, for each encoded frame, storing a fourth number of quality layers of data in one or more areas, in the data storage, previously occupied by a quality layer representing the highest resolution of the stored encoded frames.

6. The method according to claim 1, wherein the data storage is a memory and the method further comprises the step of storing the quality layers representing the same level of resolution of different media frames on adjacent memory addresses.

7. The method according to claim 1, wherein the encoder is a JPEG2000 encoder.

8. The method according to claim 1, wherein the one or more areas in the data storage previously occupied by two or more quality layers representing the highest resolutions of the stored encoded frames.

9. The method according to according to claim 1, wherein the media is video.

10. The method according to according to claim 1, wherein the media is audio.

11. A media recorder for recording a first digital stream with an unknown length comprising an unknown number of media frames, said media recorder comprising:
   a receiver configured for receiving a first media stream;
   a first encoder configured to encode each media frame in the first digital stream with an unknown length into an encoded frame, the encoded frame comprising a first number of quality layers representing successive quality refinements of the media frame, the first encoder being configured to be set up in one of several different compression modes;
   a data storage for storing the encoded frames;
   a controller configured for:
      i. simultaneously with and during ongoing making of the first digital media stream with the unknown length, detecting if the data storage is full;
      ii. if the data storage is not full, storing all the first number of quality layers for each encoded frame; and
      iii. if the data storage is full, simultaneously with and during the ongoing making of the first digital media stream, storing, based at least in part upon said detecting that the data storage is full, a second number of quality layers for each encoded frame, in a one or more areas, in the data storage previously occupied by the quality layer representing the highest resolution of the stored encoded frames the second number of quality layers differing relative to the first number of quality layers in the data storage.

12. The media recorder according to claim 11, wherein the second number of layers is equal or less than the number of quality layers of the stored encoded frames currently having the least number of quality layers.

13. The media recorder according to claim 11, wherein one of the several different compression modes is constant quality (CQ) with a target quality that is visually lossless.

14. The media recorder according to claim 11, wherein the receiver is further configured for receiving a second digital media stream.

15. The media recorder according to claim 14 further comprising a second encoder configured to encode each media frame of the second digital media stream into an encoded frame comprising a third number of quality layers and wherein the controller is further configured for:
   iv. if the data storage is not full, storing all the third number of quality layers for each encoded frame; and
   v. if the data storage is full, simultaneously with and during the ongoing making of the first digital media stream, storing a fourth number of quality layers for each encoded frame of the second media stream, in a one or more areas, in the data storage, previously occupied by one or several quality layers representing the highest resolution of stored encoded frames.

16. The media recorder according to claim 11, wherein the data storage is a memory and the controller is further configured for storing the quality layers representing the same resolution of different media frames on adjacent memory addresses.

17. The media recorder according to claim 11, wherein, the first encoder is a JPEG2000 encoder.

18. The media recorder according to claim 11, wherein the controller is further configured for, if the data storage is full, simultaneously with and during the ongoing making of the first digital media stream, storing a second number of quality layers for each encoded frame, in a data storage area previously occupied by two or more quality layers representing the highest resolutions of the stored encoded frames.

19. The media recorder according to claim 11, wherein the media is video.

20. The media recorder according to claim 11, wherein the media is audio.

21. A computer program product comprising at least one non-transitory computer readable medium having computer-readable program code portions stored therein, said computer-readable program code portions comprising programmed instructions that when executed on a computer causes the computer to perform the method according to claim 1.

* * * * *